United States Patent
Peeler et al.

(10) Patent No.: US 10,405,097 B1
(45) Date of Patent: Sep. 3, 2019

(54) SYSTEM AND METHOD OF UTILIZING AUDIO ORIENTATIONS

(71) Applicant: Dell Products L.P., Round Rock, TX (US)

(72) Inventors: Douglas Jarrett Peeler, Austin, TX (US); Srinivas Kamepalli, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/021,559

(22) Filed: Jun. 28, 2018

(51) Int. Cl.
*H04R 29/00* (2006.01)
*H04R 3/12* (2006.01)
*H04R 1/40* (2006.01)

(52) U.S. Cl.
CPC .............. *H04R 3/12* (2013.01); *H04R 1/403* (2013.01); *H04R 1/406* (2013.01); *H04R 29/002* (2013.01)

(58) Field of Classification Search
CPC .......... H04R 3/12; H04R 1/403; H04R 1/406; H04R 29/002
See application file for complete search history.

(56) References Cited

U.S. PATENT DOCUMENTS

| | | | |
|---|---|---|---|
| 2006/0050890 A1* | 3/2006 | Tsuhako | H04R 5/02 381/27 |
| 2008/0165993 A1* | 7/2008 | Cho | H04S 7/301 381/307 |
| 2008/0273725 A1* | 11/2008 | Hartung | H04R 1/403 381/302 |
| 2014/0241552 A1* | 8/2014 | Takeda | H04R 5/02 381/307 |
| 2017/0010855 A1* | 1/2017 | Lee | H04R 3/12 |
| 2018/0226931 A1* | 8/2018 | Kim | H03G 3/3005 |

OTHER PUBLICATIONS

Adel, Hidri, et al. "Beamforming techniques for multichannel audio signal separation." *arXiv preprint arXiv:1212.6080* (2012); 9 pages.
Microphone Array Beamforming, Application Note AN-1140, InvenSense Inc., Dec. 31, 2013; 12 pages.
Getting Started with AcousticBF Real-time Beam Forming Middleware, UM2214 User Manual, www.st.com, May 2017; 16 pages.

(Continued)

*Primary Examiner* — Simon King
(74) *Attorney, Agent, or Firm* — Baker Botts L.L.P.

(57) ABSTRACT

In one or more embodiments, one or more systems, methods, and/or processes may receive, via multiple microphones, a first audio signal from a first sound producing source; may convert, via at least one analog to digital converter, the first audio signal to first multiple audio data; may determine a first angle, with respect to a reference, of the first sound producing source based at least on the first multiple of audio data; may determine a sound pressure level based at least on a distance to the first sound source and a type of the multiple speakers; may produce second multiple audio data based at least on the sound pressure level and the first angle; may convert, via at least one digital to analog converter, the second multiple audio data to multiple analog audio signals; and may provide, via the multiple speakers, output audio in a direction of the first angle.

20 Claims, 11 Drawing Sheets

(56) References Cited

OTHER PUBLICATIONS

Yarra 3DX: Worlds Most Advanced 3D Audio System, Comhear, Inc., Retrieved from url: https://www.indiegogo.com/projects/yarra-3dx-worlds-most-advanced-3d-audio-system-sound#/, 2017; 12 pages.

The Technology: How it works—YARRA 3DX, Comhear, Inc., 2017; 9 pages.

Concepts and Technologies Fueling the Growth of Comhear's Advanced Audio Products, Comhear, Inc., rev. Jul. 17, 2017; 16 pages.

Meet sowlo. A New Species of Sound., Noveto Systems Ltd, 2011-2016, Retrieved from url: http://www.noveto.biz/technology/; 3 pages.

\* cited by examiner

SYSTEM AND METHOD OF UTILIZING AUDIO ORIENTATIONS

BACKGROUND

Field of the Disclosure

This disclosure relates generally to information handling systems and more particularly to information handling systems with utilizing audio orientations.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may receive, via multiple microphones, a first audio signal from a first sound producing source; may convert, via at least one analog to digital converter, the first audio signal to first multiple audio data; may determine a first angle, with respect to a reference, of the first sound producing source based at least on the first multiple of audio data; may determine, via a proximity sensor, a distance to the first sound source; may determine a sound pressure level based at least on the distance to the first sound source and a type of the multiple speakers; may produce second multiple audio data based at least on the sound pressure level and the first angle; may convert, via at least one digital to analog converter, the second multiple audio data to multiple analog audio signals; may provide the multiple analog signals to the multiple speakers; and may provide, via the multiple speakers, output audio in a direction of the first angle. In one or more embodiments, determining the sound pressure level based at least on the distance to the first sound source and the type of the multiple speakers may include accessing a lookup table based at least on the type of the multiple speakers and retrieving a number associated with the type of the multiple speakers.

In one or more embodiments, producing the second multiple audio data based at least on the sound pressure level and the first angle of the first sound producing source may include producing first audio data of the second multiple audio data with a phase difference with respect to second audio data of the second multiple audio data. In one or more embodiments, providing the multiple analog signals to the multiple speakers may include providing a first analog signal, with the phase difference, of the multiple analog signals to a first speaker of the multiple speakers and providing a second analog signal of the multiple analog signals to a second speaker of the multiple speakers. In one or more embodiments, determining the first angle, with respect to the reference, of the first sound producing source based at least on the first multiple audio data may include determining a phase difference between first audio data, associated with a first microphone of the multiple microphones, of the first multiple audio data and second audio data, associated with a second microphone of the multiple microphones, of the first multiple audio data.

In one or more embodiments, one or more systems, methods, and/or processes may further provide first rotation data, associated with the first angle of the first sound producing source, to a camera rotator. For example, a camera may be rotated, based at least on the first rotation data, to a direction of the first sound producing source. In one or more embodiments, one or more systems, methods, and/or processes may further receive, via the multiple microphones, a second audio signal from a second sound producing source, different from the first sound producing source; may convert, via the at least one analog to digital converter, the second audio signal to second multiple audio data; may determine a second angle, with respect to the reference, of the second sound producing source based at least on the second multiple audio data; and may provide second rotation data, associated with the second angle of the second sound producing source, to the camera rotator. For example, the camera may be rotated, based at least on the second rotation data, to a direction of the second sound producing source.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
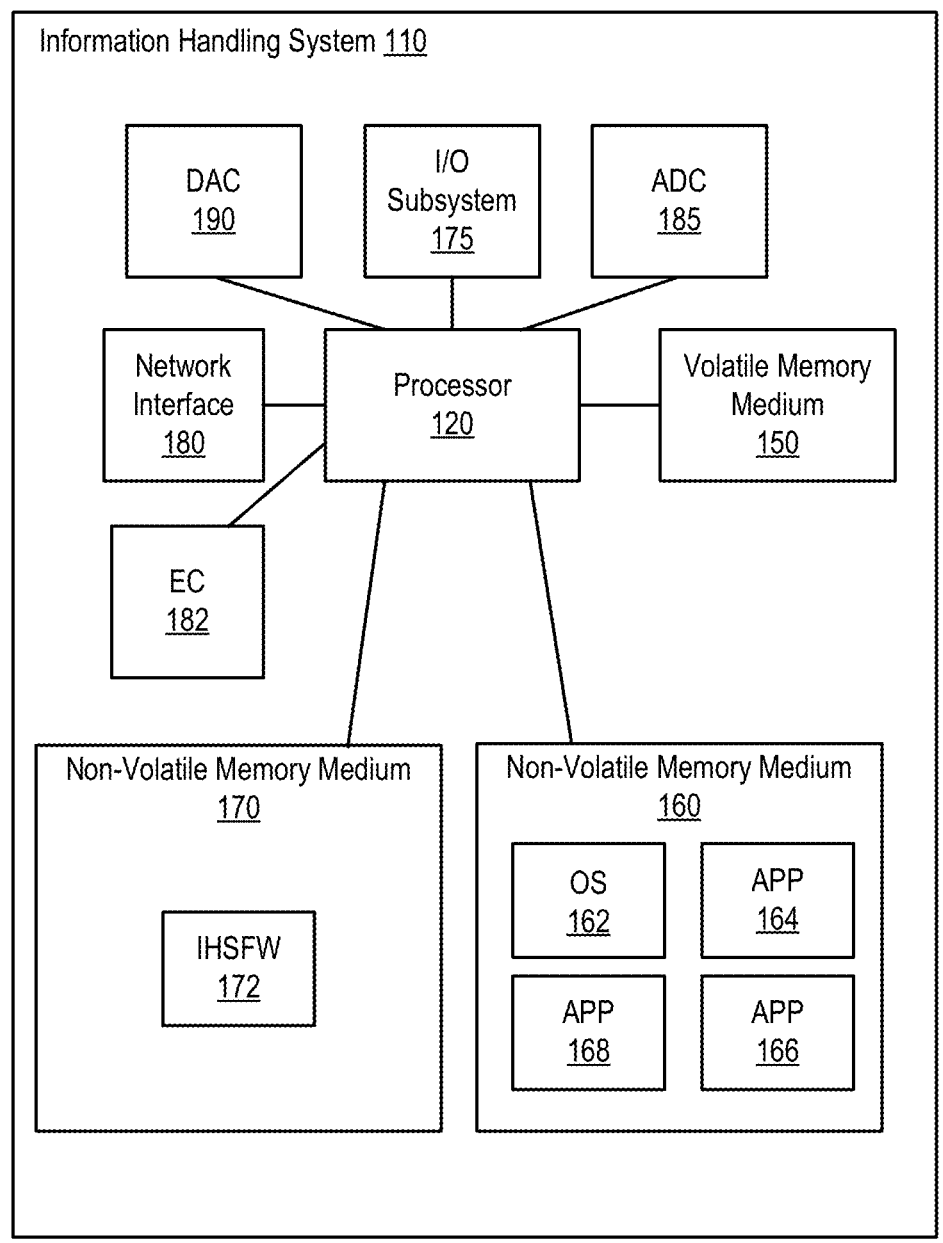
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may be utilized with voice and/or video communications. For example, an information handling system may be utilized with video conferencing and/or audio conferencing. In one instance, an information handling system may include one or more microphones and/or one or more cameras, among others. In another instance, an information handling system may be coupled to one or more microphones and/or one or more cameras, among others.

In one or more embodiments, an information handling system may be utilize multiple microphones. For example, the information handling system may utilize the multiple microphones with one or more beam forming methods and/or one or more beam forming processes, among others. In one instance, one or more beam forming methods and/or one or more beam forming processes may reduce one or more undesirable sounds (e.g., noise). In another instance, one or more beam forming methods and/or one or more beam forming processes may be utilized in determining one or more positions of one or more respective people.

In one or more embodiments, one or more beam forming methods and/or one or more beam forming processes may utilized in determining an angle of a person with respect to a reference. In one example, the reference may be or include a front of an information handling system. In another example, the reference may be or include a position associated with multiple microphones. In one or more embodiments, the angle of the person with respect to the reference may be utilized in providing audio to the person. For example, the audio may be directed to the person. In one instance, the person may be able to hear the audio while other one or more people may hear the audio at a reduced sound pressure level. In another instance, the person may be able to hear the audio while other one or more people may not hear the audio. In one or more embodiments, if the audio is directed to the person, the person may not wear a headset. For example, if the person does not wear a headset, the person may not become fatigued from a headset.

In one or more embodiments, determining an angle of a person with respect to a reference may be repeated. For example, repeating determining an angle of a person with respect to a reference may permit and/or allow audio to be directed to the person if the person moves. In one or more embodiments, a proximity detector may be utilized in determining a distance to the person. For example, determining a distance to the person may permit a sound pressure level of the audio to be increased or decreased if the person moves. In one or more embodiments, a camera may be rotated to a direction of a person that is speaking. In one example, the camera may be rotated to a first direction associated with a first angle of a first person that is speaking. In another example, the camera may be rotated to a second direction associated with a second angle of a second person that is speaking.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In a second example, a bus of IHS 110 may include one or more of an Inter-IC Sound ($I^2S$) bus, a SoundWire bus, and a high definition audio (HDA) interface, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in nonvolatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, an embedded controller (EC) 182, an analog to digital converter (ADC) 185, and a digital to analog converter (DAC) 90. As illustrated, volatile memory medium 150, non-volatile memory media 160 and 170, I/O subsystem 175, network interface 180, EC 182, ADC 185, and DAC 190 may be communicatively coupled to processor 120.

In one or more embodiments, one or more of volatile memory medium 150, non-volatile memory media 160 and 170, I/O subsystem 175 network interface 180, EC 182, ADC 185, and DAC 190 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may be or include one or more of a system, a device, and an apparatus operable to interpret and/or execute program instructions and/or process data, among others, and may be or include one or more of a microprocessor, a microcontroller, a digital signal processor (DSP), an application specific integrated circuit (ASIC), and another digital and/or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, EC 182 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 182 may be or include one or more of a field programmable gate array (FPGA) and an ASIC, among others, configured, coded, and/or encoded with instructions in accordance with one or more of systems, flowcharts, methods, and/or processes described herein.

In one or more embodiments, processor 120 and one or more components of IHS 110 may be included in a system-on-chip (SoC). For example, the SoC may include processor 120 and a platform controller hub (not specifically illustrated).

Figure 1B:
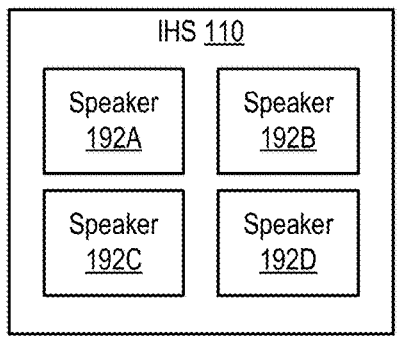
FIGS. 1B and 1C illustrate examples of an information handling system and speakers, according to one or more embodiments.
Figure 1D:
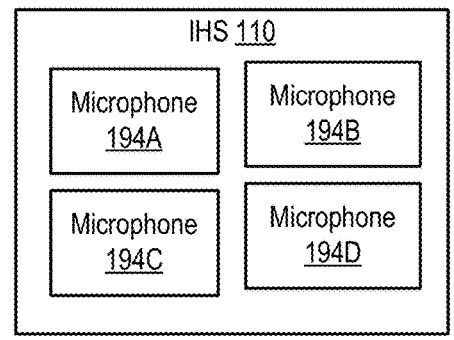
FIGS. 1D and 1E illustrate examples of an information handling system and microphones, according to one or more embodiments.
Figure 1C:
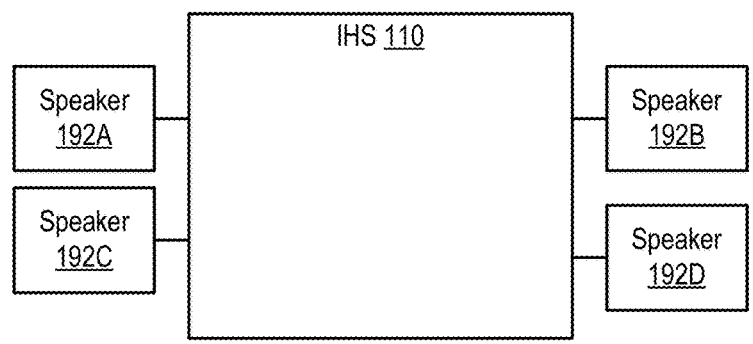

Turning now to FIGS. 1B and 1C, examples of an information handling system and speakers are illustrated, according to one or more embodiments. As shown in FIG. 1B, IHS 110 may include speakers 192A-192D. As illustrated in FIG. 1C IHS 110 may be coupled to speakers 192A-192D. Although not specifically illustrated, one or more of speakers 192A-192D may be coupled to DAC 190. In one or more embodiments, IHS 110 may include multiple digital to analog converts (DACs). For example, each of one or more of speakers 192A-192D may be coupled to each of one or more respective DACs 190.

Figure 1E:
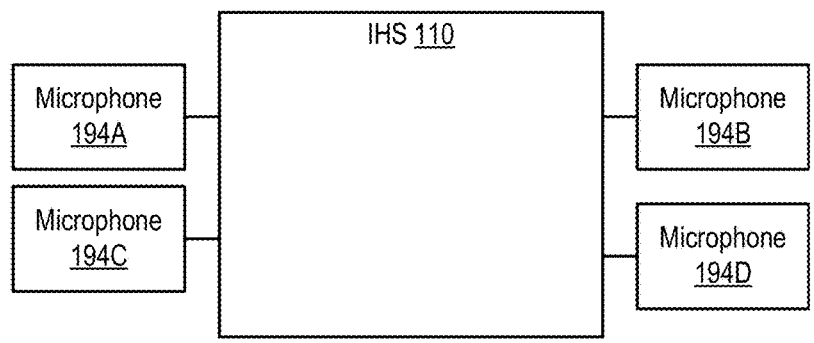

Turning now to FIGS. 1D and 1E, examples of an information handling system and microphones are illustrated, according to one or more embodiments. As shown in FIG. 1D, IHS 110 may include microphones 194A-194D. As illustrated in FIG. 1E, IHS 110 may be coupled to microphones 194A-194D. Although not specifically illustrated, one or more of microphones 194A-194D may be coupled to ADC 185. In one or more embodiments, IHS 110 may include multiple analog to digital converts (ADCs). For example, each of one or more of microphones 194A-194D may be coupled to each of one or more respective ADCs 185.

Figure 1F:
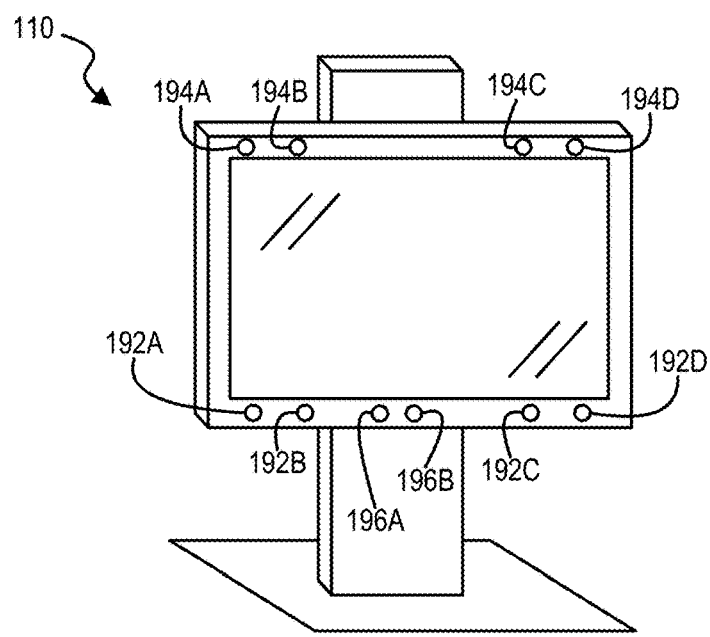
FIGS. 1F and 1G illustrate examples of an information handling system with speakers and microphones, according to one or more embodiments.
Figure 1G:
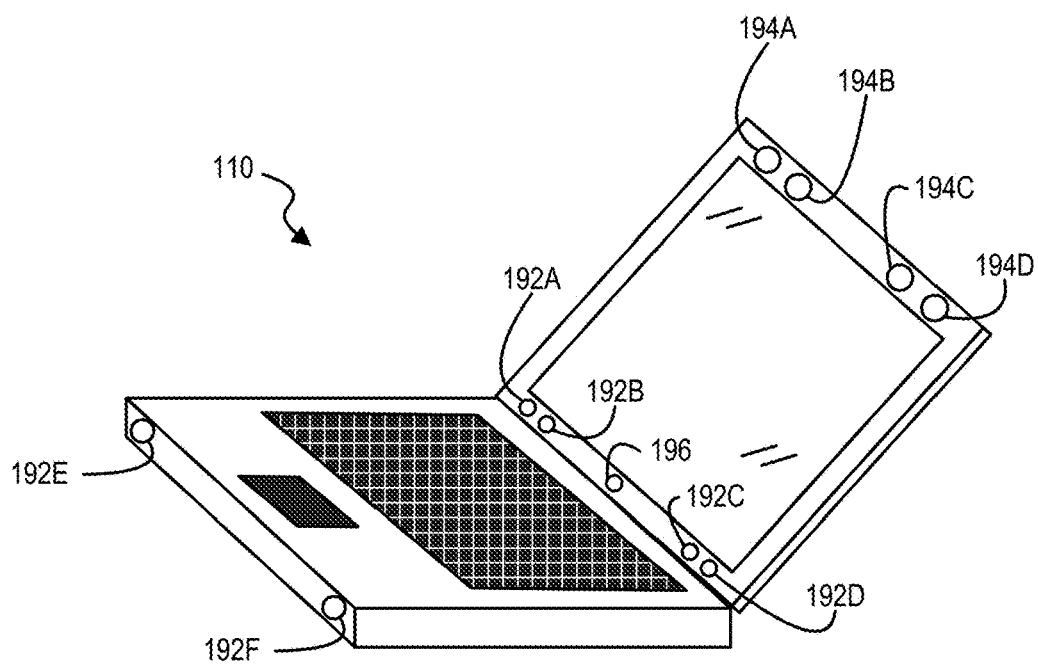

Turning now to FIGS. 1F and 1G, examples of an information handling system with speakers and microphones are illustrated, according to one or more embodiments. As shown in FIG. 1F, speakers 192A-192D, microphones 194A-194D, and proximity sensors 196A and 196B may be located on a front side of a housing of IHS 110. As illustrated in FIG. 1G, speakers 192A-192D, microphones 194A-194D, and a proximity sensor 196 may be located on a lid of IHS 110, and speakers 192E and 192F may be located on a housing of IHS 110.

Figure 2:
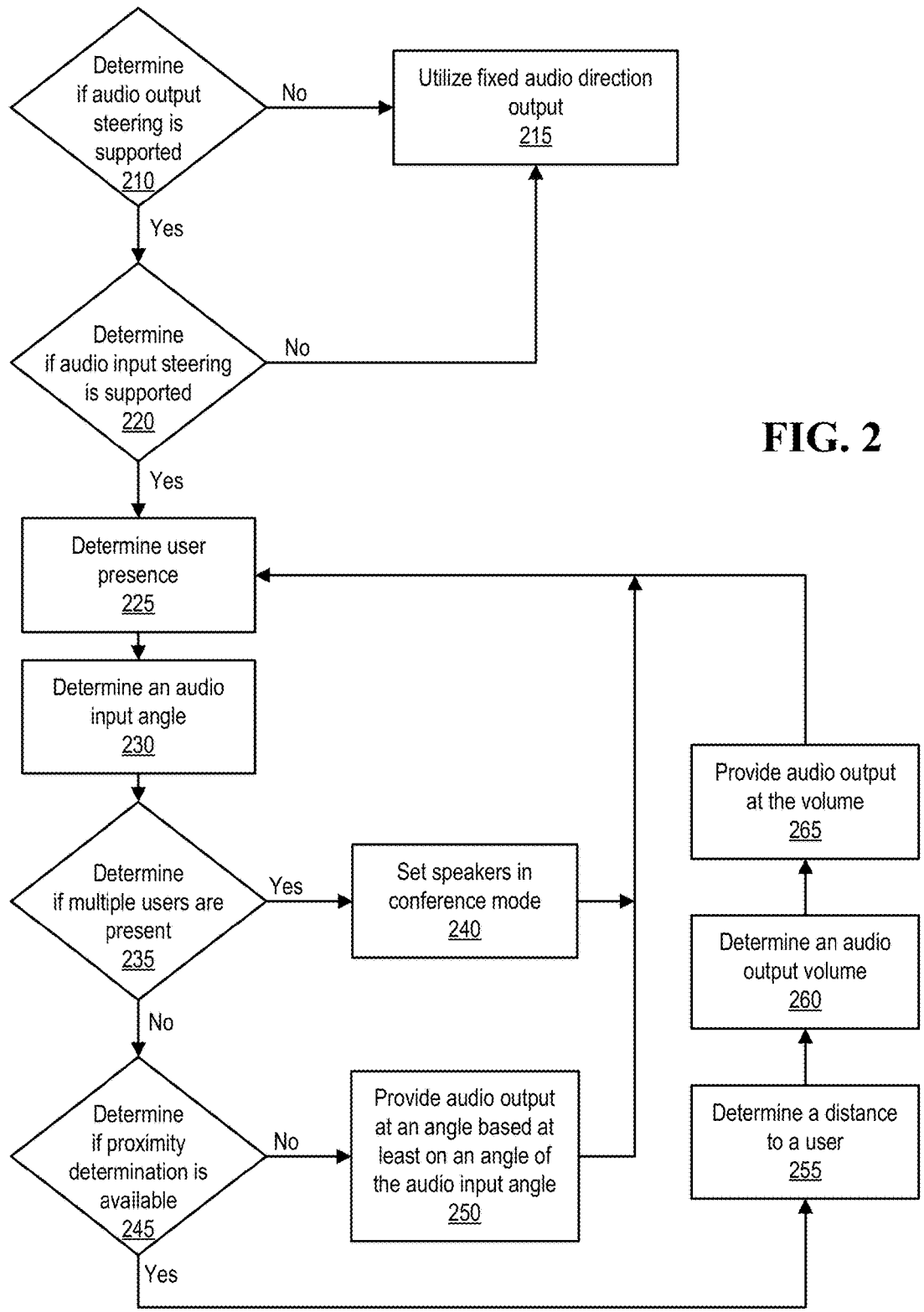
FIG. 2 illustrates an example of a method of operating an information handling system, according to one or more embodiments.

Turning now to FIG. 2, an example of a method of operating an information handling system is illustrated, according to one or more embodiments. At 210, it may be determined if audio output steering is supported. If output steering is not supported, a fixed audio direction out may be utilized, at 215. If output steering is supported, it may be determined if audio input steering is supported, at 220. If audio input steering is not supported, the method may proceed to 215. If audio input steering is supported, a user presence may be determined, at 225. At 230, an audio input angle may be determined. For example, an audio input angle may be determined with respect to a reference. In one instance, the reference may be or include a front of IHS 110. In another instance, the reference may be or include a position associated with multiple of microphones 194A-194D.

At 235, it may be determined if multiple users are present. If multiple users are present, multiple speakers (e.g., multiple of speakers 192A-192D) may be set in a conference mode (e.g., no audio output steering), at 240. In one or more embodiments, the method may proceed to 225. If multiple users are not present, it may be determined if proximity determination is available, 245. In one or more embodiments, determining if proximity determination is available may include determining if IHS 110 includes or is coupled to a proximity sensor. For example, a proximity sensor may determine a distance from the proximity sensor to a person (e.g., a user). In one or more embodiments, IHS 110 may include or may be coupled to a proximity sensor. For example, a proximity sensor may be communicatively coupled to processor 120, which may receive information that indicates one or more distances or includes information that may be utilized in determining one or more distances.

In one or more embodiments, a proximity sensor may be or include a time of flight sensor. For example, the time of flight sensor may produce a signal and measure an amount of time between transmitting the signal and receiving a reflection of at least a portion of the signal. For instance, at least a portion of the signal may be reflected by the person to the time of flight sensor. In one or more embodiments, a distance to the person may be determined by the amount of time between transmitting the signal and receiving the reflection of at least the portion of the signal and a speed of the signal. In one example, the signal may be a light signal. For instance, a speed of a light signal may be or may be approximate to 299,792,458 meters per second. In another example, the signal may be a sound signal. For instance, a speed of a sound signal may be or may be approximate to 343 meters per second.

If proximity determination is not available, audio output at an angle, based at least on an angle of the audio input angle, may be provided, at 250. In one or more embodiments, the method may proceed to 225. If proximity determination is available, a distance to a user may be determined, at 255. For example, a proximity sensor may determine a distance to the user. For instance, the proximity sensor may provide the distance to processor 120.

At 260, an audio output volume may be determined. In one or more embodiments, an audio output volume may be or include a sound pressure level. In one or more embodiments, determining an audio output volume may include accessing a lookup table. For example, the lookup table may include two or more types of speakers. For instance, the lookup table may include multiple speaker types associated with respective numbers. In one or more embodiments, determining an audio output volume may include utilizing the distance to the user. For example, determining an audio output volume may be based at least on the distance to the user. In one or more embodiments, determining an audio output volume may include one or more computations based at least on the distance to the user and/or based at least on a number from the lookup table associated with a type of speaker.

At 265, audio output may be provided at the audio output volume. In one example, the audio output may be or include audio from a participant of an audio conference. In another example, the audio output may be or include audio from a participant of a video conference. In one or more embodiments, the method may proceed to 225.

Figure 3A:
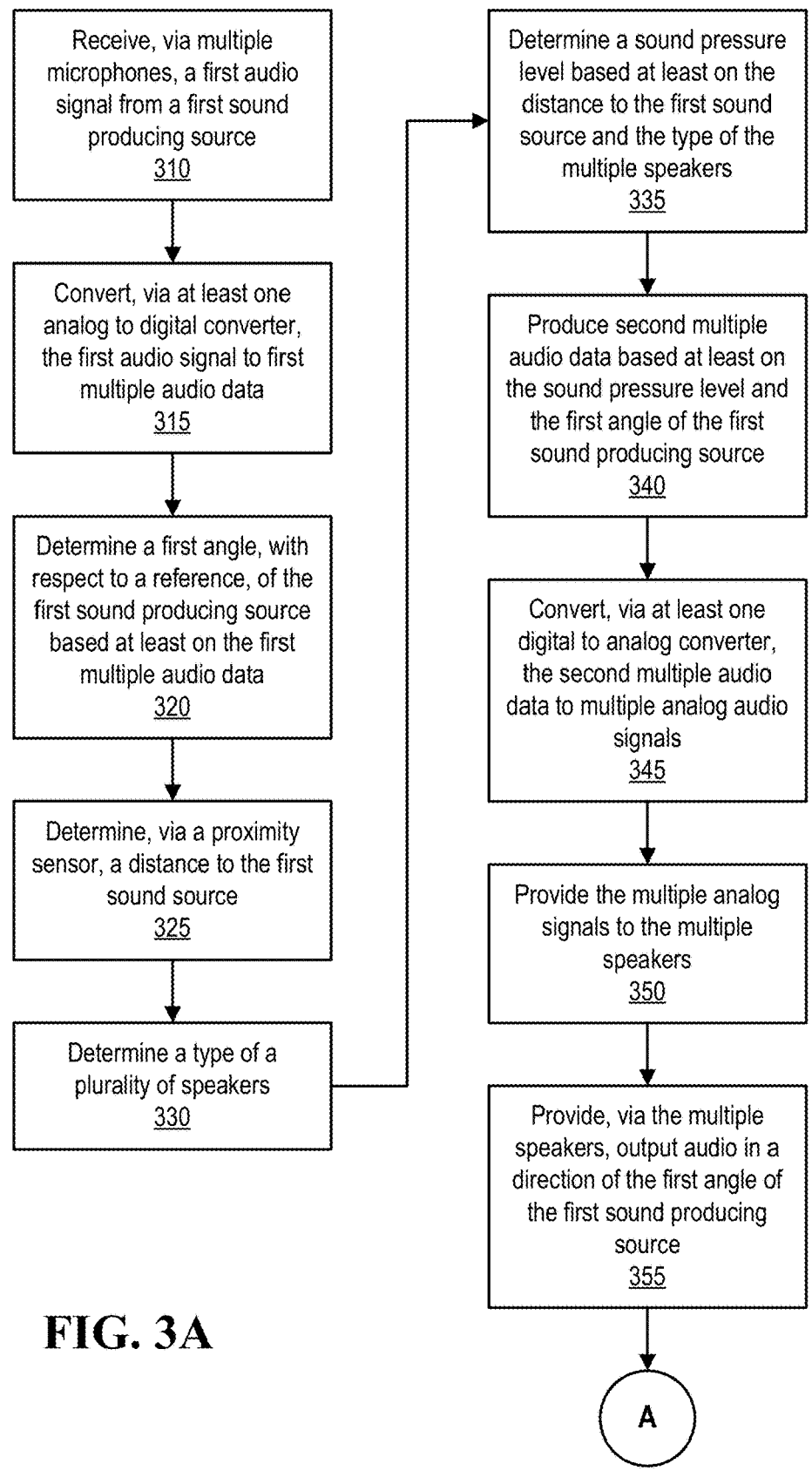
FIGS. 3A and 3B illustrate another example of a method of operating an information handling system, according to one or more embodiments.
Figure 3B:
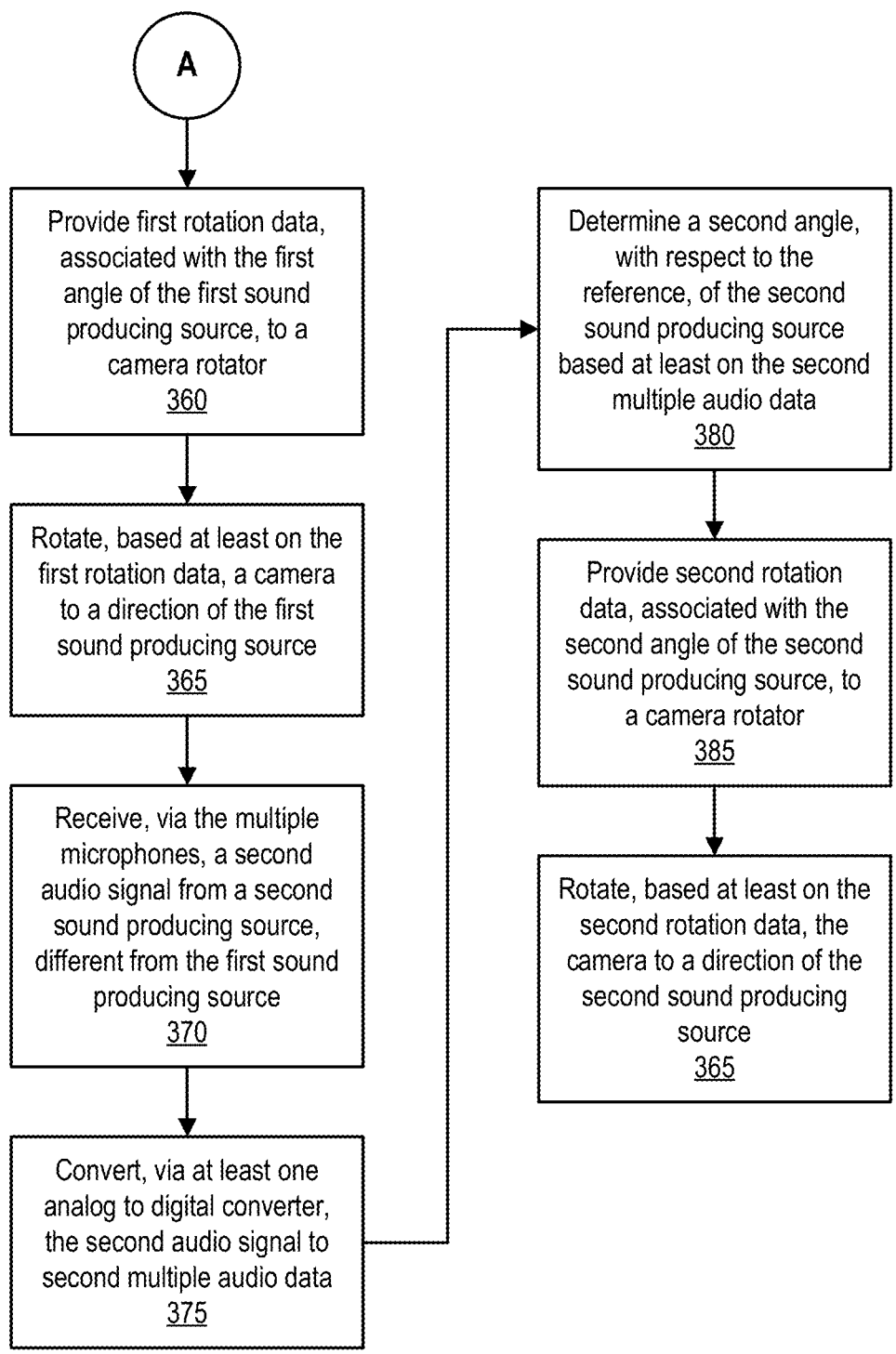
Figure 4A:
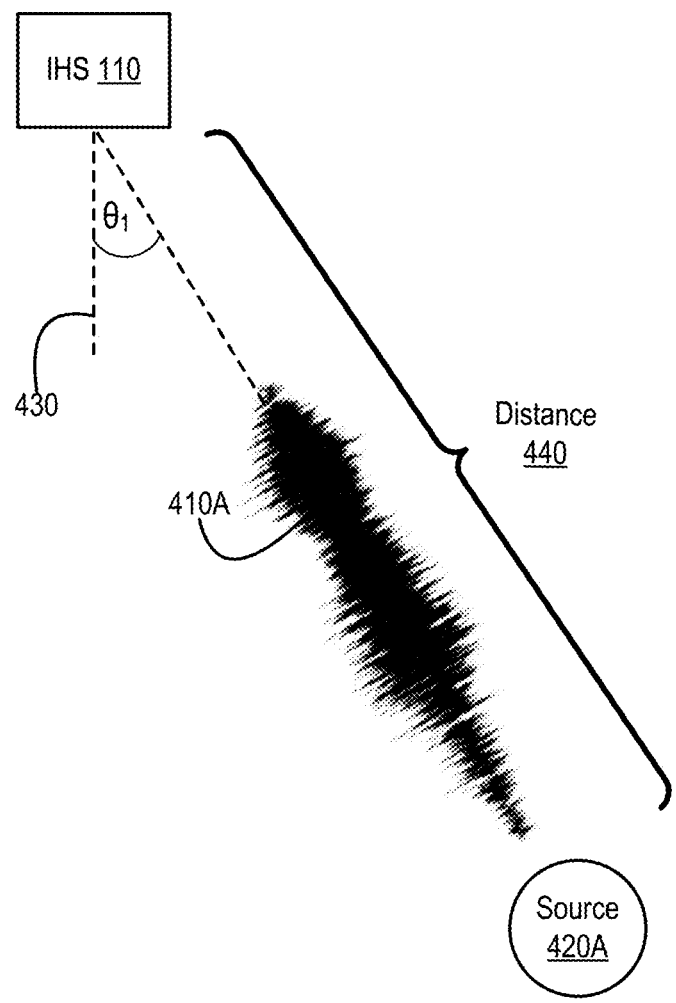
FIG. 4A illustrates an example an information handling system, a first sound producing source, and a first audio signal, according to one or more embodiments.

Turning now to FIGS. 3A and 3B, another example of a method of operating an information handling system is illustrated, according to one or more embodiments. At 310, a first audio signal from a first sound producing source may be received via multiple microphones. As shown in FIG. 4A, for example, audio signal 410A may be received from a sound producing source 420A via multiple microphones. For instance, multiple of microphones 194A-194D may receive audio signal 410A. In one or more embodiments, sound producing source 420A may be a person.

At 315, the first audio signal may be converted to first multiple audio data. For example, one or more analog to digital converters may convert the first audio signal to first multiple audio data. In one instance, one or more analog to digital converters may convert multiple voltage signals, base at least on the first audio signal, from the multiple microphones to first multiple audio data. In another instance, one or more analog to digital converters may convert multiple current signals, base at least on the first audio signal, from the multiple microphones to first multiple audio data.

At 320, a first angle, with respect to a reference, of the first sound producing source may be determined based at least on the first multiple audio data. As illustrated in FIG. 4A, for example, $\theta_1$ may be determined with respect to a reference 430. In one or more embodiments, determining the first angle, with respect to the reference, of the first sound producing source based at least on the first multiple audio data may include determining a phase difference between first audio data, associated with a first microphone of the multiple microphones, of the first multiple audio data and second audio data, associated with a second microphone of the multiple microphones, of the first multiple audio data.

At 325, a distance to the first sound source may be determined via a proximity sensor. As illustrated in FIG. 4A, for example, a distance 440 may be determined. At 330, a type of a multiple speakers may be determined. In one or more embodiments, determining a type of multiple speakers may include retrieving information from a configuration.

At 335, a sound pressure level may be determined based at least on the distance to the first sound source and the type of the plurality of speakers. For example, a first type of speakers may produce more or less of a sound pressure level than another type of speakers with the same audio signal applied. In one or more embodiments, determining the sound pressure level based at least on the distance to the first sound source and the type of the multiple speakers may include accessing a lookup table based at least on the type of the multiple speakers and retrieving a number associated with the type of the multiple speakers.

At 340, second multiple audio data based at least on the sound pressure level and the first angle of the first sound producing source may be produced. In one or more embodiments, producing the second multiple audio data based at least on the sound pressure level and the first angle of the first sound producing source may include producing first audio data of the second multiple audio data with a phase difference with respect to second audio data of the second multiple audio data.

At 345, the second multiple audio data may be converted to multiple analog audio signals via one or more digital to analog converters. In one example, one or more digital to analog converters may convert the second multiple audio data to analog voltage signals. In another example, one or more digital to analog converters may convert the second multiple audio data to analog current signals.

Figure 4B:
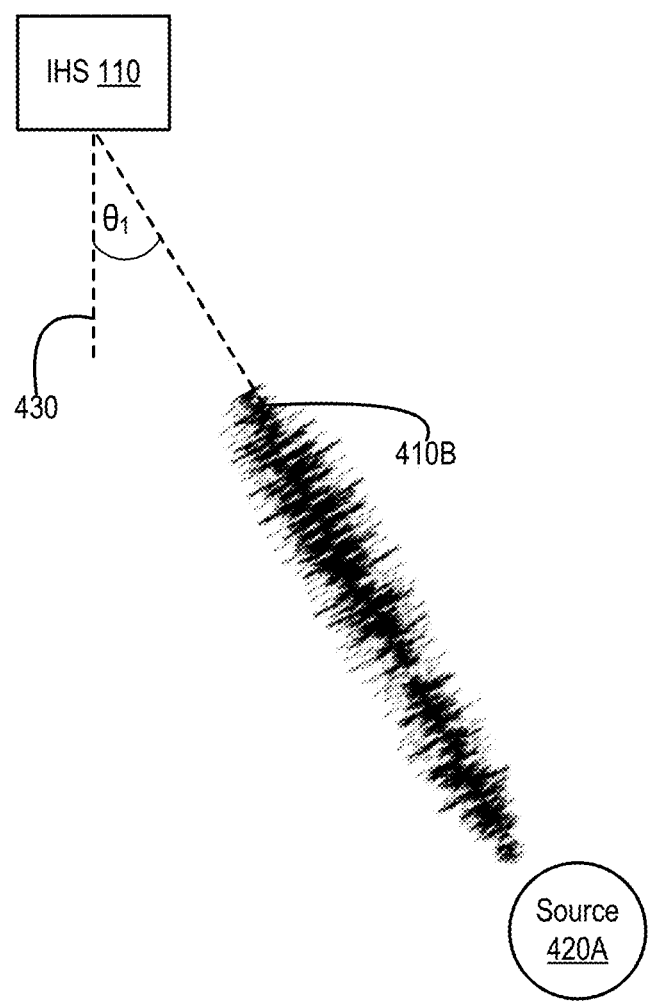
FIG. 4B illustrates an example the information handling system, the first sound producing source, and a second audio signal, according to one or more embodiments.

At 350, the multiple analog signals may be provided to the multiple speakers. In one example, each of the analog voltage signals may be provided to each of the multiple speakers. In another example, each of the analog current signals may be provided to each of the multiple speakers. At 355, output audio may be provided in a direction of the first angle of the first sound producing source. As illustrated in FIG. 4B, for example, output audio 410B may be provided in a direction of el.

Figure 4C:
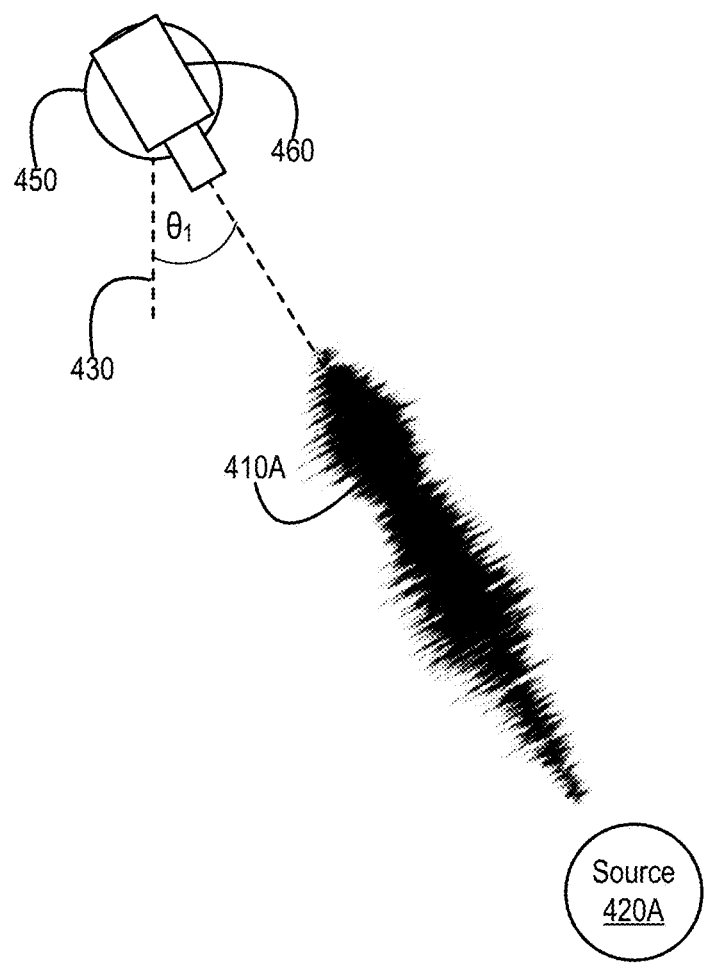
FIG. 4C illustrates an example a camera rotator, a camera, the first sound producing source, and the first audio signal, according to one or more embodiments.

At 360, first rotation data, associated with the first angle of the first sound producing source, may be provided to a camera rotator. As shown in FIG. 4C, for example, first rotation data, associated with $\theta_1$, may be provided to a camera rotator 450. In one or more embodiments, IHS 110 may provide first rotation data, associated with the first angle of the first sound producing source, to a camera rotator. In one example, IHS 110 may provide first rotation data to the camera rotator in a wireless fashion. In another example, IHS 110 may provide first rotation data to the camera rotator in a wired fashion.

At 365, a camera may be rotated, based at least on the first rotation data, to a direction of the first sound producing source. As illustrated in FIG. 4C, for example, a camera 460 may be rotated to a direction of sound producing source 420A. For instance, camera rotator 450 may rotate camera 460, based at least on the first rotation data, to a direction of sound producing source 420A. In one or more embodiments, camera rotator 450 may include motor that may rotate camera 460. In one example, the motor may be or include a servomotor that may rotate camera 460. In another example, the motor may be or include a stepper motor that may rotate camera 460.

Figure 4D:
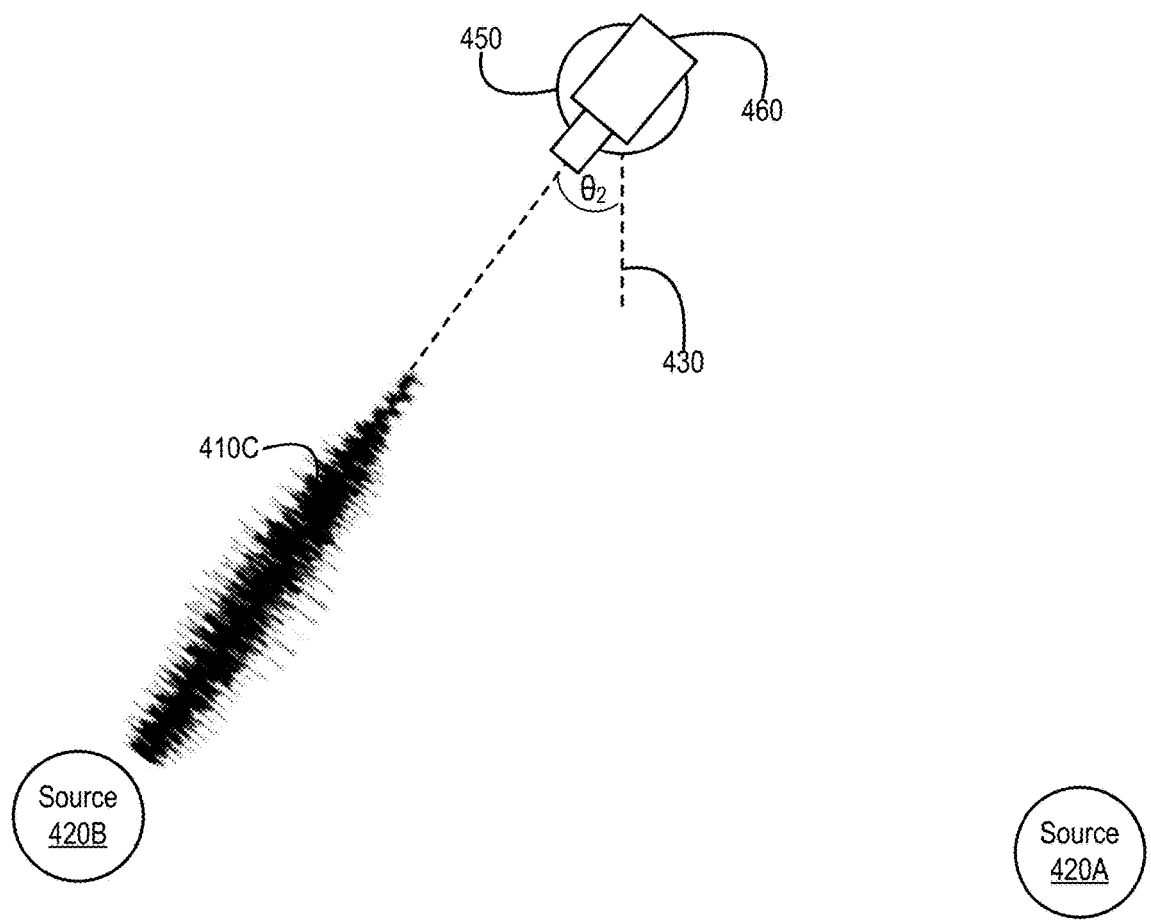
FIG. 4D illustrates an example the camera rotator, the camera, a second sound producing source, and a third audio signal, according to one or more embodiments.

At 370, a second audio signal from a second sound producing source may be received via the multiple microphones. As shown in FIG. 4D, for example, audio signal 410C may be received from a sound producing source 420B via multiple microphones. For instance, multiple of microphones 194A-194D may receive audio signal 410C. In one or more embodiments, sound producing source 420B may be a person. In one example, sound producing source 420B may be sound producing source 420A. For instance, the same person may have moved. In another example, sound producing source 420B may be different from sound producing source 420A. For instance, sound producing source 420A may be a first person, and sound producing source 420B may be a second person, different from the first person.

At 375, the second audio signal may be converted to second multiple audio data. For example, one or more analog to digital converters may convert the second audio signal to second multiple audio data. In one instance, one or more analog to digital converters may convert multiple voltage signals, base at least on the second audio signal, from the multiple microphones to second multiple audio data. In another instance, one or more analog to digital converters may convert multiple current signals, base at least on the second audio signal, from the multiple microphones to second multiple audio data.

At 380, a second angle, with respect to the reference, of the second sound producing source may be determined based at least on the second multiple audio data. As illustrated in FIG. 4D, for example, $\theta_2$ may be determined with respect to reference 430. In one or more embodiments, determining the second angle, with respect to the reference, of the second sound producing source based at least on the second multiple audio data may include determining a phase difference between first audio data, associated with a first microphone of the multiple microphones, of the second multiple audio data and second audio data, associated with a second microphone of the multiple microphones, of the second multiple audio data.

At 385, second rotation data, associated with the second angle of the second sound producing source, may be provided to the camera rotator. For example, second rotation data, associated with $\theta_2$, may be provided to camera rotator 450. In one or more embodiments, IHS 110 may provide second rotation data, associated with the second angle of the second sound producing source, may be provided to the camera rotator. In one example, IHS 110 may provide second rotation data to the camera rotator in a wireless fashion. In another example, IHS 110 may provide second rotation data to the camera rotator in a wired fashion.

At 390, the camera may be rotated, based at least on the second rotation data, to a direction of the second sound producing source. As illustrated in FIG. 4D, for example, camera 460 may be rotated to a direction of sound producing source 420B. For instance, camera rotator 450 may rotate camera 460, based at least on the second rotation data, to a direction of sound producing source 420B.

Figure 5:
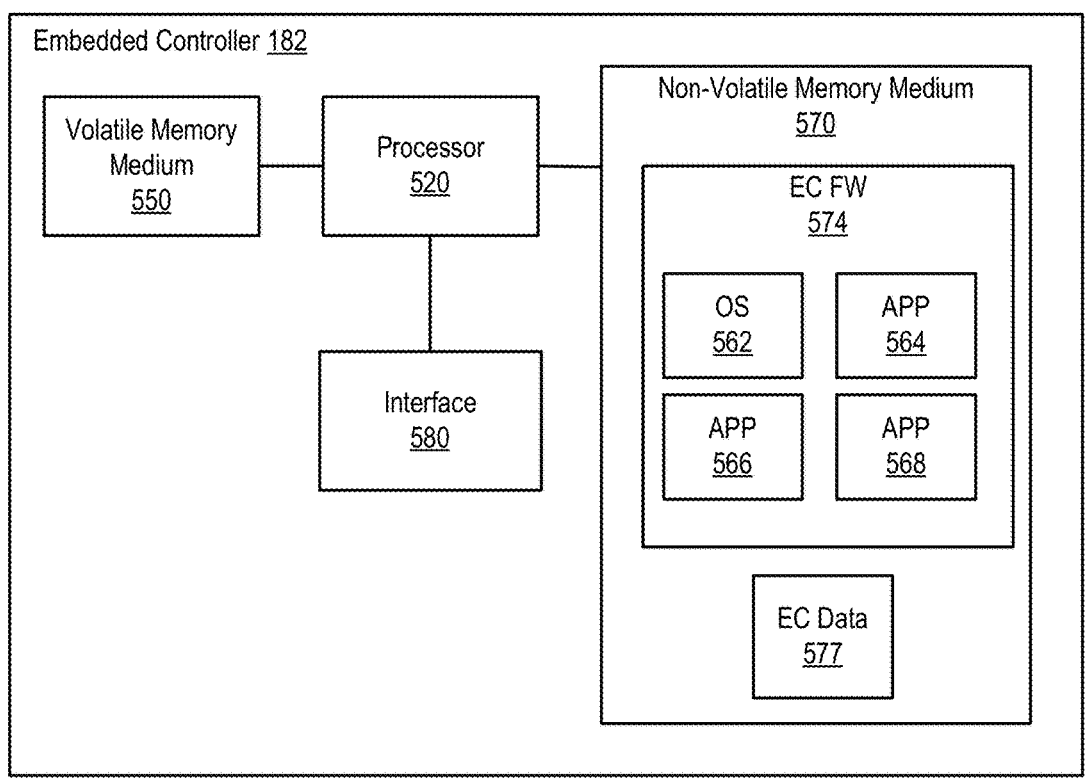
FIG. 5 illustrates an example embedded controller, according to one or more embodiments.

Turning now to FIG. 5, an example embedded controller is illustrated, according to one or more embodiments. As shown, EC 182 may include a processor 520, a volatile memory medium 550, a non-volatile memory medium 570, and an interface 580. As illustrated, non-volatile memory medium 574 may include an EC FW 574, which may include an OS 562 and APPs 564-568, and may include EC data 577. For example, OS 562 may be or include a real-time operating system (RTOS).

In one or more embodiments, interface 580 may include circuitry that enables communicatively coupling to one or more devices. In one example, interface 580 may include circuitry that enables communicatively coupling to one or more buses. In a second example, interface 580 may include circuitry that enables one or more interrupt signals to be received. In one instance, interface 580 may include general purpose input/output (GPIO) circuitry, and the GPIO circuitry may enable one or more interrupt signals to be received and/or provided via at least one interrupt line. In another instance, interface 580 may include GPIO circuitry that may enable EC 182 to provide and/or receive signals associated with other circuitry. In a third example, interface 580 may include circuitry that enables communicatively coupling to one or more networks. In one instance, interface 580 may include circuitry that enables communicatively coupling to network interface 180. In another example, interface 580 may include a network interface.

In one or more embodiments, one or more of OS 562 and APPs 564-568 may include processor instructions executable by processor 520. In one example, processor 520 may execute processor instructions of one or more of OS 562 and APPs 564-568 via non-volatile memory medium 570. In another example, one or more portions of the processor instructions of the one or more of OS 562 and APPs 564-568 may be transferred to volatile memory medium 550, and processor 520 may execute the one or more portions of the processor instructions of the one or more of OS 562 and APPs 564-568 via volatile memory medium 550. In one or more embodiments, processor 520 may utilize EC data 577. In one example, processor 520 may utilize EC data 577 via non-volatile memory medium 570. In another example, one or more portions of EC data 577 may be transferred to volatile memory medium 550, and processor 520 may utilize EC data 577 via volatile memory medium 550. In one or more embodiments, processor 520 may execute processor instructions in implementing one or more systems, flowcharts, methods, and/or processes described herein. For example, processor 520 may execute processor instructions from one or more of memory media 550 and 570 in implementing one or more systems, flowcharts, methods, and/or processes described herein.

In one or more embodiments, a processor (e.g., processor 120, processor 520, etc.) of IHS 110 may circuitry and/or instructions utilized in digital signal processing. In one example, the circuitry and/or the instructions utilized in digital signal processing may include one or more of a multiply—accumulate operation, a convolution operation, a dot product operation, a polynomial evaluation operation, a Fourier transform operation, a fast Fourier transform operation, and a fast Fourier transform cross-referencing operation, among others. In another example, the circuitry utilized in digital signal processing may include one or more finite impulse response filters, one or more infinite impulse response filters, and/or single instruction multiple data, among others.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor; and
a memory medium, coupled to the at least one processor, that stores instructions executable by the at least one processor, which when executed by the at least one processor, cause the information handling system to:
receive, via a plurality of microphones, a first audio signal from a first sound producing source;
convert, via at least one analog to digital converter, the first audio signal to a first plurality of audio data;
determine a first angle, with respect to a reference, of the first sound producing source based at least on the first plurality of audio data;
determine, via a proximity sensor, a distance to the first sound producing source;
determine a type of a plurality of speakers;
determine a sound pressure level based at least on the distance to the first sound producing source and the type of the plurality of speakers;
produce a second plurality of audio data based at least on the sound pressure level and the first angle of the first sound producing source;
convert, via at least one digital to analog converter, the second plurality of audio data to a plurality of analog audio signals;
provide the plurality of analog signals to the plurality of speakers; and
provide, via the plurality of speakers, output audio in a direction of the first angle of the first sound producing source.

2. The information handling system of claim 1, wherein the instructions further cause the information handling system to:
provide first rotation data, associated with the first angle of the first sound producing source, to a camera rotator.

3. The information handling system of claim 2, wherein the instructions further cause the information handling system to:
rotate, based at least on the first rotation data, a camera to a direction of the first sound producing source.

4. The information handling system of claim 2, wherein the instructions further cause the information handling system to:
receive, via the plurality of microphones, a second audio signal from a second sound producing source, different from the first sound producing source;
convert, via the at least one analog to digital converter, the second audio signal to a second plurality of audio data;
determine a second angle, with respect to the reference, of the second sound producing source based at least on the second plurality of audio data; and
provide second rotation data, associated with the second angle of the second sound producing source, to the camera rotator.

5. The information handling system of claim 1, wherein, to determine the sound pressure level based at least on the distance to the first sound producing source and the type of the plurality of speakers, the instructions further cause the information handling system to:
access a lookup table based at least on the type of the plurality of speakers; and
retrieve a number associated with the type of the plurality of speakers.

6. The information handling system of claim 1,
wherein, to produce the second plurality of audio data based at least on the sound pressure level and the first angle of the first sound producing source, the instructions further cause the information handling system to produce first audio data of the second plurality of audio data with a phase difference with respect to second audio data of the second plurality of audio data; and
wherein, to provide the plurality of analog signals to the plurality of speakers, the instructions further cause the information handling system to:
provide a first analog signal, with the phase difference, of the plurality of analog signals to a first speaker of the plurality of speakers; and
provide a second analog signal of the plurality of analog signals to a second speaker of the plurality of speakers.

7. The information handling system of claim 1, wherein, to determine the first angle, with respect to the reference, of the first sound producing source based at least on the first plurality of audio data, the instructions further cause the information handling system to determine a phase difference between first audio data, associated with a first microphone of the plurality of microphones, of the first plurality of audio data and second audio data, associated with a second microphone of the plurality of microphones, of the first plurality of audio data.

8. A method, comprising:
receiving, via a plurality of microphones, a first audio signal from a first sound producing source;
converting, via at least one analog to digital converter, the first audio signal to a first plurality of audio data;
determining a first angle, with respect to a reference, of the first sound producing source based at least on the first plurality of audio data;
determining, via a proximity sensor, a distance to the first sound producing source;
determining a type of a plurality of speakers;
determining a sound pressure level based at least on the distance to the first sound producing source and the type of the plurality of speakers;
producing a second plurality of audio data based at least on the sound pressure level and the first angle of the first sound producing source;
converting, via at least one digital to analog converter, the second plurality of audio data to a plurality of analog audio signals;
providing the plurality of analog signals to the plurality of speakers; and
providing, via the plurality of speakers, output audio in a direction of the first angle of the first sound producing source.

9. The method of claim 8, further comprising:
providing first rotation data, associated with the first angle of the first sound producing source, to a camera rotator.

10. The method of claim 9, further comprising:
rotating, based at least on the first rotation data, a camera to a direction of the first sound producing source.

11. The method of claim 9, further comprising:
receiving, via the plurality of microphones, a second audio signal from a second sound producing source, different from the first sound producing source;
converting, via the at least one analog to digital converter, the second audio signal to a second plurality of audio data;

determining a second angle, with respect to the reference, of the second sound producing source based at least on the second plurality of audio data; and providing second rotation data, associated with the second angle of the second sound producing source, to the camera rotator.

12. The method of claim 8, wherein the determining the sound pressure level based at least on the distance to the first sound producing source and the type of the plurality of speakers includes:

accessing a lookup table based at least on the type of the plurality of speakers; and retrieving a number associated with the type of the plurality of speakers.

13. The method of claim 8, wherein the producing the second plurality of audio data based at least on the sound pressure level and the first angle of the first sound producing source includes producing first audio data of the second plurality of audio data with a phase difference with respect to second audio data of the second plurality of audio data; and wherein the providing the plurality of analog signals to the plurality of speakers includes:

providing a first analog signal, with the phase difference, of the plurality of analog signals to a first speaker of the plurality of speakers; and providing a second analog signal of the plurality of analog signals to a second speaker of the plurality of speakers.

14. The method of claim 8, wherein the determining the first angle, with respect to the reference, of the first sound producing source based at least on the first plurality of audio data includes determining a phase difference between first audio data, associated with a first microphone of the plurality of microphones, of the first plurality of audio data and second audio data, associated with a second microphone of the plurality of microphones, of the first plurality of audio data.

15. A computer-readable non-transitory memory medium that includes instructions that, when executed by at least one processor of an information handling system, cause the information handling system to:

receive, via a plurality of microphones, a first audio signal from a first sound producing source;

convert, via at least one analog to digital converter, the first audio signal to a first plurality of audio data;

determine a first angle, with respect to a reference, of the first sound producing source based at least on the first plurality of audio data;

determine, via a proximity sensor, a distance to the first sound producing source;

determine a type of a plurality of speakers;

determine a sound pressure level based at least on the distance to the first sound producing source and the type of the plurality of speakers;

produce a second plurality of audio data based at least on the sound pressure level and the first angle of the first sound producing source;

convert, via at least one digital to analog converter, the second plurality of audio data to a plurality of analog audio signals;

provide the plurality of analog signals to the plurality of speakers; and provide, via the plurality of speakers, output audio in a direction of the first angle of the first sound producing source.

16. The computer-readable non-transitory memory medium of claim 15, wherein the instructions further cause the information handling system to:

provide first rotation data, associated with the first angle of the first sound producing source, to a camera rotator.

17. The computer-readable non-transitory memory medium of claim 16, wherein the instructions further cause the information handling system to:

receive, via the plurality of microphones, a second audio signal from a second sound producing source, different from the first sound producing source;

convert, via the at least one analog to digital converter, the second audio signal to a second plurality of audio data;

determine a second angle, with respect to the reference, of the second sound producing source based at least on the second plurality of audio data; and provide second rotation data, associated with the second angle of the second sound producing source, to the camera rotator.

18. The computer-readable non-transitory memory medium of claim 15, wherein, to determine the sound pressure level based at least on the distance to the first sound producing source and the type of the plurality of speakers, the instructions further cause the information handling system to:

access a lookup table based at least on the type of the plurality of speakers; and retrieve a number associated with the type of the plurality of speakers.

19. The computer-readable non-transitory memory medium of claim 15, wherein, to produce the second plurality of audio data based at least on the sound pressure level and the first angle of the first sound producing source, the instructions further cause the information handling system to produce first audio data of the second plurality of audio data with a phase difference with respect to second audio data of the second plurality of audio data; and wherein, to provide the plurality of analog signals to the plurality of speakers, the instructions further cause the information handling system to:

provide a first analog signal, with the phase difference, of the plurality of analog signals to a first speaker of the plurality of speakers; and provide a second analog signal of the plurality of analog signals to a second speaker of the plurality of speakers.

20. The computer-readable non-transitory memory medium of claim 15, wherein, to determine the first angle, with respect to the reference, of the first sound producing source based at least on the first plurality of audio data, the instructions further cause the information handling system to determine a phase difference between first audio data, associated with a first microphone of the plurality of microphones, of the first plurality of audio data and second audio data, associated with a second microphone of the plurality of microphones, of the first plurality of audio data.

* * * * *